INVENTOR.
ROBERT J. ROBINSON
BY
Lawrence H. Paxton
AGENT

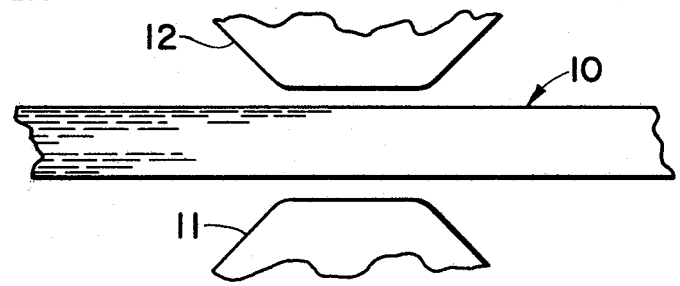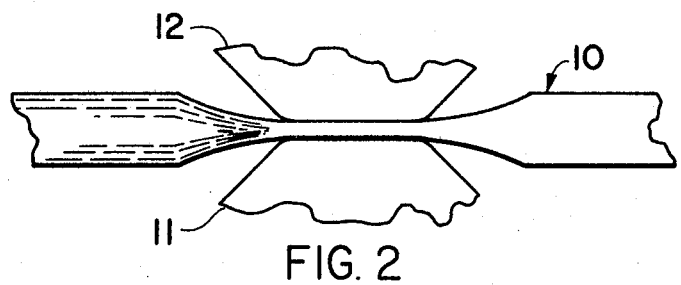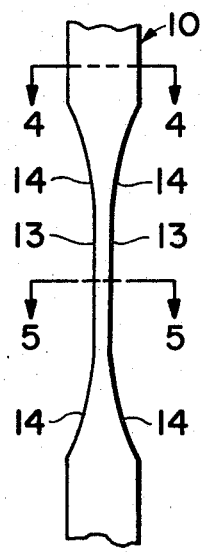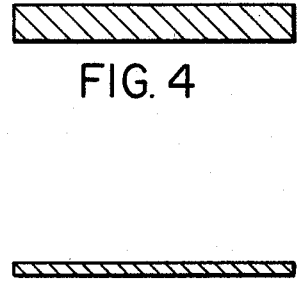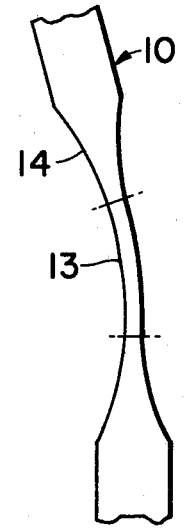

United States Patent Office 3,514,989
Patented June 2, 1970

3,514,989
METHOD FOR DIE FORMING FLEXURES USING EDGE CONSTRAINT
Robert J. Robinson, Lexington, Mass., assignor to the Foxboro Company, Foxboro, Mass., a corporation of Massachusetts
Filed Oct. 4, 1967, Ser. No. 672,909
Int. Cl. B21d 31/00; E05d 7/00
U.S. Cl. 72—377                                                           1 Claim

ABSTRACT OF THE DISCLOSURE

A method for forming a metal flexure by compressing a transverse portion of a metal bar and simultaneously urging constraint shoes inwardly against the metal bar.

This invention relates to flexures, particularly as used in industrial instruments.

---

A flexure in this sense is a spring hinged made of a resilient member which can be bent back and forth about a relatively fixed axis, instead of an actual hinge movable about a hinge pin.

Such flexures have been found useful in many ways. Some are simply flat strips which are resilient enough for a hinge function. Two or more such strips may be mounted with coaxial axes and with the planes of the strips approximately at right angles to obtain a support system which can safely be loaded by large radial forces in any direction.

In some cases single strip, or bar units are transversely milled or otherwise have stock removed to form a reduced thickness portion so that to some extent the unit can be used as a flexure. Other devices may be in the form of long, thin, metal strips, flexible throughout their length.

Thus, prior art flexures have customarily have produced by metal removal or by fabricating assemblies of pieces of appropriate thickness. Both methods are costly, and the results unsuitable for high precision systems.

Metal removal in a part intended to have good spring properties typically produces a degraded surface. The original smooth rolled surface, with large amounts of cold work, and with all marks parallel to direction of principal stress, is removed. The metal removal operation produces a relatively rough surface. The tool marks are usually in a direction perpendicular to the principal stress, producing stress concentrations. The grain structure in the final piece is not appropriate. In the case of metal removal by grinding, the properties of the surface metal may be deteriorated.

The shape and metallurgical properties of the surface metal of a flexure are critical to fatigue life. Presumably hysteresis is also adversely affected by metal removal.

Fabricated flexures have areas of stress concentration possible at various points, sometimes at a weld or other fastening area. Clamped flexure assemblies often exhibit large hysteresis because of flexure versus clamp sliding near the edge in the clamped area.

Die formed flexures of the present invention have none of these shortcomings. Instead, for many metals, the surface will have enhanced properties because of the additional cold work inherent in the die forming action.

Previous attempts at producing flexures by die forming have been unsuccessful in part because of undesirable metal flow characteristics during forming.

For purposes of the present discussion, the die formed flexure is assumed to comprise an area of greatly reduced thickness in a relatively long metallic strip. The flexure is assumed to be central on the original stock thickness, to extend at right angles from edge to edge of the strip, and to be relatively short lengthwise of the strip. It is to be understood that application of this invention is not limited to the above assumed conditions.

Essentially, reduction in stock thickness is obtained by local application, to opposite faces of the flexure, of compressive forces great enough to cause plastic flow of the metal. This flow will occur outward from the area gripped by the dies exerting the stress.

The larger fraction of this flow must be in a direction parallel to the strip length since the larger fraction of the periphery of the die-flexure contact area is normal to this direction.

Consideration of the above flow permits accurate calculation of the strip elongation as a function of thickness reduction. There are sections of variable thickness making the transition from the original stock thickness to the final flexure thickness. The shape of these sections can be accurately predicted by calculation of strip elongation versus thickness reduction.

At and near the strip edges, the metal is free to flow laterally outward from the strip edges, as well as lengthwise of the strip, and the compressive stress at the edges is correspondingly reduced.

The reduced compressive stress at the edges reduces the stress in the dies in these zones. Die compression is consequently smaller than at the center and the flexures are correspondingly thinner at the edges than at the center, resulting in flow outward from the edges. To account for this increased width, the dies must be wider than the original strip width. These relatively unstressed die extensions lend to support the die metal where it is stressed by the flexure edge, further reducing flexure edge thickness and increasing the outward flow.

Consider small elements of metal lengthwise of the strip and central on the strip thickness. After flexure formation the element central between strip edges will still be straight, by reason of the assumed symmetry of the forming process, but will have been elongated by a predictable amount.

Metal elements at the strip edges will have elongated by a greater amount because, while the element ends have extended exactly as far as those of the central element, the edge elements are curved rather than straight.

The increased elongation of the edge elements, together with the reduced compressive stress at the edge, causes edge formation by tensile rather than compressive stress.

The result is that, as the forming proceeds, a limiting flexure thinness is reached. Further forming beyond this point results in tensile failures near the intersections of the die and the strip edges. Severe grain boundary dislocations occur at these points and along the nearby strip edges before this limiting thinness is reached.

The resulting flexures thus have unpredictable fatigue life, and may well have large hysteresis caused by grain boundry slippage.

Experiments show that when the dies are crowned to compensate for the non-uniform die compression, the flexure will crack after less forming than the above limit, although the edges are more nearly straight. Evidently the further reduction in edge compressive stress outweighs the reduced edge elongation in requiring tensile stress.

In contrast to this relatively non-uniform thickness prior art flexures, resulting from die deflection, and the uncontrolled geometry and grain structure near the strip edges, flexures of the present invention are formed with high precision and controlled grain structures since the plastic flow is entirely guided, and the compressive stress is relatively uniform across the width of the strip at every stage of flexure formation. Further, the dies can be and are made almost exactly as wide as the strip and the die deflection is therefore relatively uniform everywhere from edge to edge of the strip.

These improvements are accomplished in the present invention by the use of edge constraints or shoes which prevent metal flow outward from the strip edges. In the absence of sliding friction between the following metal and the shoe surfaces, this would result in uniform compressive stress.

In practice, the shoes could be attached to, or part of, one of the dies. The effect of the above friction does appreciably increase the compressive stress near the strip edge and at the other die however, and it is preferable that the shoes be free to travel in the direction of die motion, as described in the illustrative die system.

Advantages of good spring properties and long fatigue life are inherent in the chosen metal, and are not degraded by the formation of flexures according to this invention and its method.

Other objects and advantages of this invention will be in part apparent and in part pointed out hereinafter and in the accompanying drawings, in which:

FIG. 1 is a schematic of flexure piece about to be die formed, according to this invention;

FIG. 2 illustrates the forming of the piece of FIG. 1;

FIG. 3 illustrates the neck down flexure form of the piece of FIGS. 1 and 2;

Figure 7:
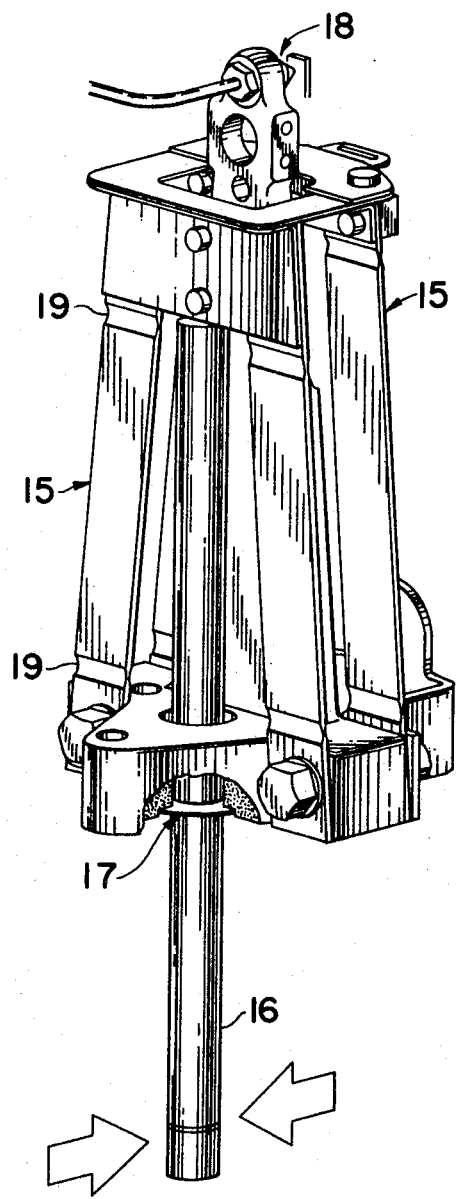
Figure 8:
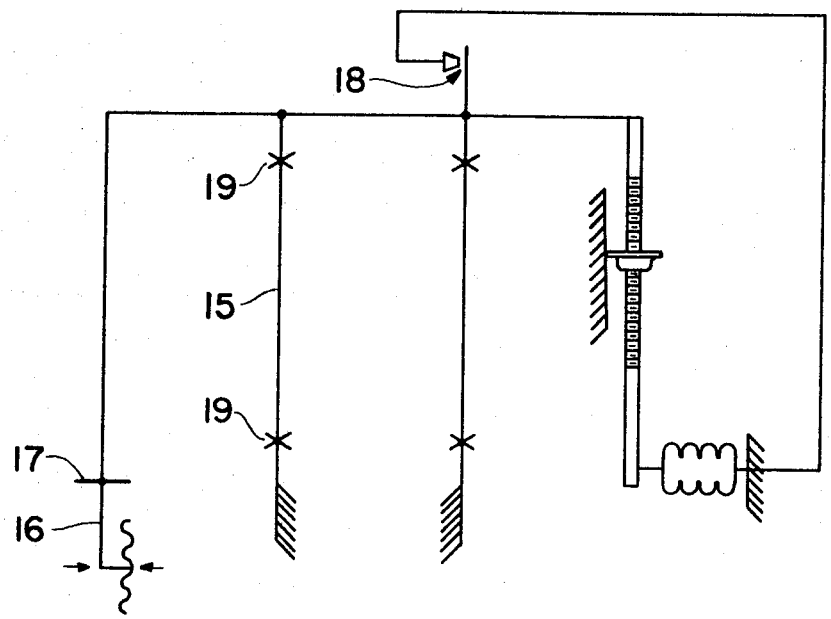
Figure 10:
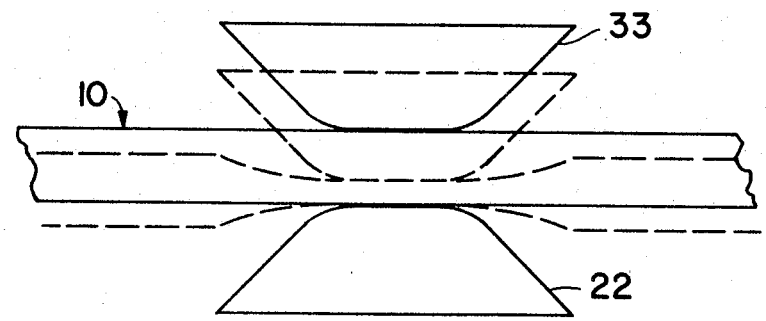
Figure 9:
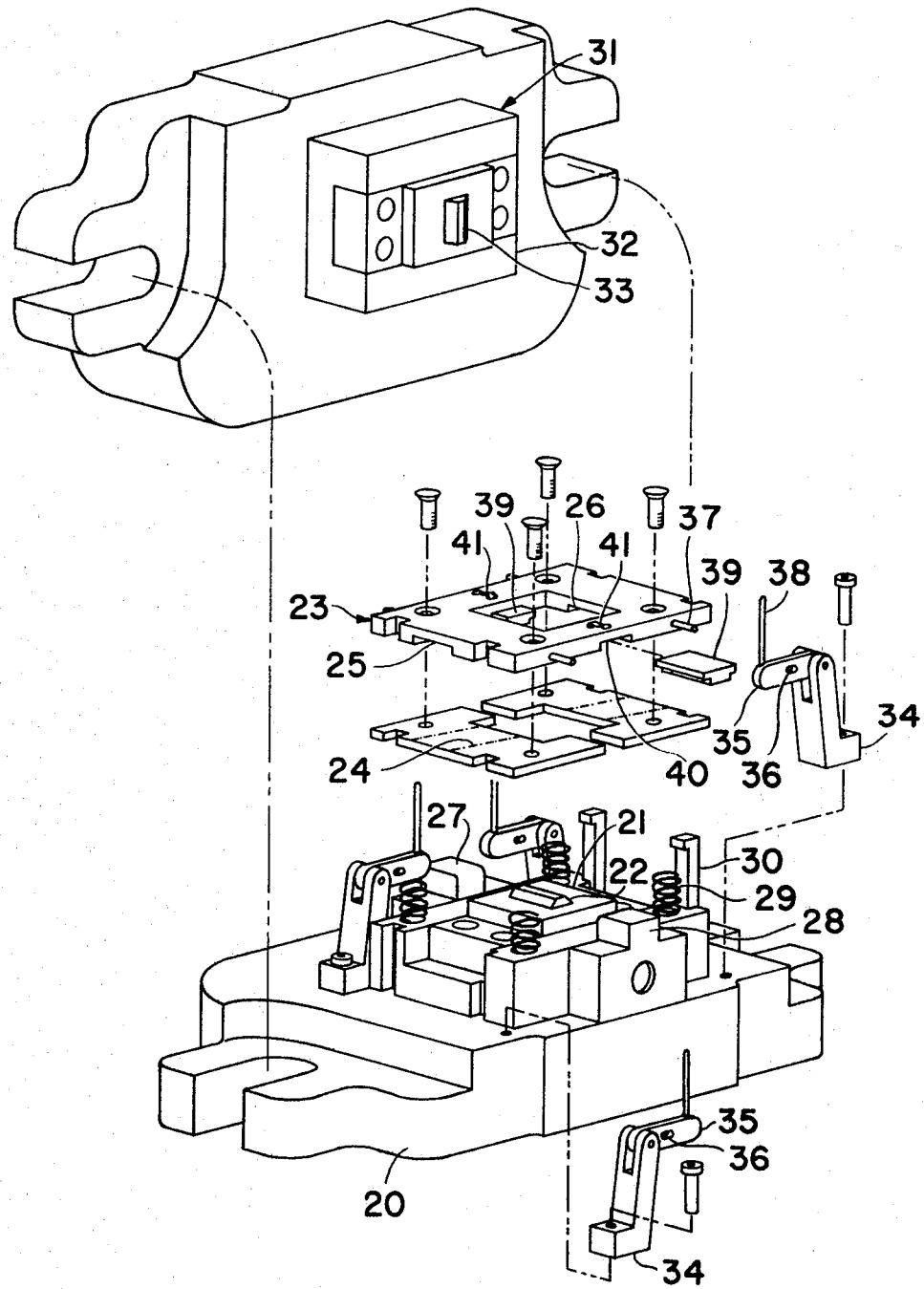
Figure 11:
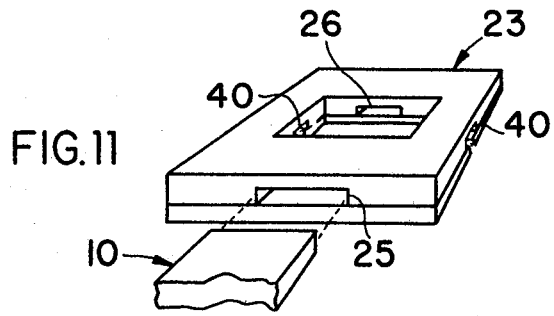
Figure 12:
Figure 13:
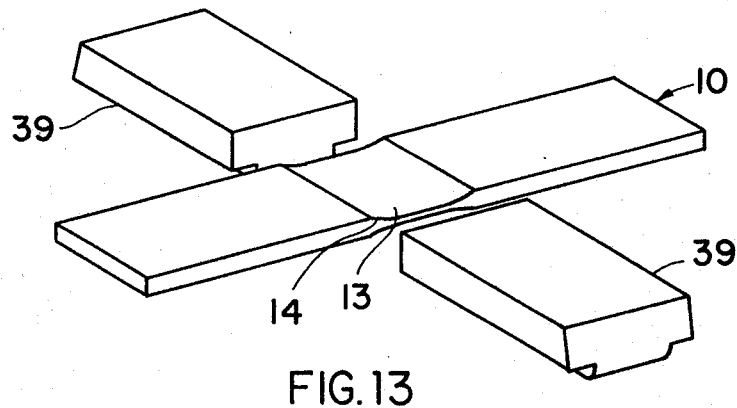
Figure 14:
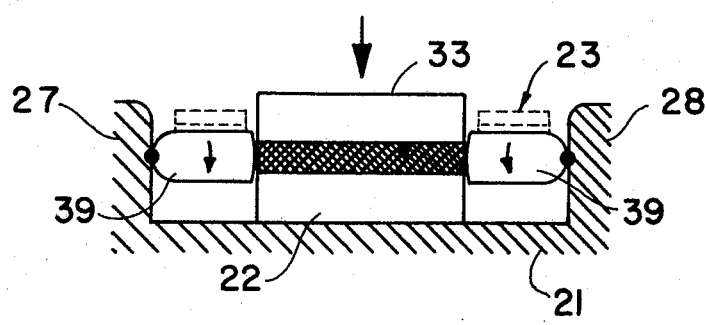

FIGS. 4 and 5 are cross-sections of the flexure piece of FIG. 3, taken on lines 4—4 and 5—5 of FIG. 3;

FIG. 6 illustrates the flexure of FIG. 3 as deflected;

FIG. 7 is an illustration of an industrial control differential pressure measurement assembly, utilizing flexure supports according to this invention;

FIG. 8 is a schematic of an industrial control system embodying the assembly of FIG. 7;

FIG. 9 is an exploded view of a die system for forming flexures according to this invention;

FIG. 10 is a further illustration of the die forming of flexures according to this invention;

FIGS. 11 and 12 are illustrations of the flexure piece carriage of FIG. 9;

FIG. 13 illustrates the relative locations of the flexure piece and edge constraining shoes of FIG. 9, with the shoe spaced from the piece for clearer showing, and;

FIG. 14 illustrates the location and action of the edge constraining shoes of FIG. 9, during the die forming.

The drawing series of FIGS. 1 through 6 illustrate the die forming and the shape of the edge constraint formed flexure. The edge constraint is illustrated in FIGS. 9, 13 and 14.

In FIG. 1, an unformed metal flexure strip piece 10 is placed between a fixed die 11 and a movable die 12. In FIG. 2, the movable die 12 has engaged and formed the flexure piece 10 against the fixed die 11. As in FIG. 3, the necked down portion of the flexure piece 10 is thus provided with duplicate, opposing curved surface forms. Each of these forms comprises a central portion 13, which is substantially flat except for a short circular arc shaped section at each end, die contact formed as a die replication area, flanked on each side by a curved portion 14 as flow generated areas precisely tangent to portion 13. These flanking curves extend significantly beyond the die contact dimension, as connection surfaces between the flat central portion 13 and their respective unformed surfaces of the flexure piece.

Flexing occurs in area 13, on a relatively constant radius basis without subtantially deflecting the flanking curve forms 14 as in FIG. 6.

In FIGS. 1 and 2, the direction of the grain is indicated by partial showing of dotted lines. In the flexure according to this invention, no material is lost in ofrming, and the grain forms are reshaped, not cut. The flexure surface is superior to those formed by other methods, such as milling, and the smoothly tangent, large radius curves allow of no harmful stress concentration points.

The cold worked surface is at least as good as prior to die forming, and is believed to be improved.

In FIG. 7, flexure legs 15 are shown as supports in an industrial instrument differential pressure sensing unit. A force generated by differential pressure is applied to the lower end of a force bar 16. Pivotal movement of the force bar by means of a support and sealing diaphragm 17 results in top structure variation of a nozzle-baffle 18 adjustment representative of the measured differential pressure. The flexures 15 provide the top structure with guided movement not subject to twisting, and restrain against very large upward forces exerted on bar 16 by internal pressure with precise flexure action provided according to this invention. In this instance, each flexure piece is necked down adjacent each end of the piece, with the necked down, die formed flexure channels 19, at such an angle across the flexure pieces as to provide horizontal flexure axes on the non-parallel flexure legs 15, which can thus be used as the non-vertical supports required in this measurement structure.

FIG. 8 is a functional schematic of a measurement system using the structure of FIG. 7, shown simply as representative of an application of flexures according to this invention.

FIG. 9 illustrates a die apparatus for forming flexures according to this invention. FIG. 10 through 14 are explanatory showings of parts and functions of the die apparatus of FIG. 9.

In FIG. 9, a fixed die base 20 has mounted thereon a fixed die block 21, with a bottom die 22 having a bar shape of frusto-triangular cross-section. The top of the die 22 is a flat, rectangular strip, with slightly rounded side edges. In the operating position, the flexure strip to be formed lies with the top of the die 22 transversely of the strip, in this case at an angle other than 90°. In the flexure carriage assembly 23, this angle is illustrated by the positional lines 24, matching with the flexure piece slots 25 and 26. The flexure carriage 23 is illustrated further, in FIGS. 11 and 12.

Further, on the die base 20, fixed buttresses 27 and 28 are located opposite the ends of the bottom die 22, see FIG. 14.

The flexure carriage 23 is spring pressed upward by corner springs 29 on the die base 20, against holding fingers 30.

The top die structure is indicated at 31, with a top die base 32 and the top die 33, matching the shape and size of the bottom die 22.

As the top die structure 31 is moved down, it moves the flexure carriage 23 and the flexure piece down with it at half the speed and therefor by half the distance of the top die speed and travel. FIG. 10 illustrates the resultant relative movements of the dies and the flexure piece.

As in FIG. 10, from the point of first touching, in full lines, to the point of finished die forming, in dotted lines, as an example, the top die may move a distance of two thirds the thickness of the flexure, while the flexure itself is moved a distance of one third the thickness of the flexure.

This half speed movement of the flexure carriage 23 is accomplished by a lever arrangement on each corner of the die structure. In each case a lever support bracket 34 is mounted on the bottom die base 20. As the upper end of the bracket 34 a lever arm 35 is pivoted about a horizontal axis. Halfway along the lever a mounting hole 36 is provided to receive a laterally extending pin 37, fixed in the flexure carriage 23. At the outer end of the lever arm 35 a vertical pin or screw 38 is adjustably fixed, to extend upward and to be engaged by the top die structure 31 as this structure descends. Thus as the top die and the pin 38, moves down, the carriage 23 moves with the lever hole 36, one half the movement of the carriage. The flexure when in place in the carriage slots 25 and 26, moves with the carriage.

Edge constraint of the flexure is accomplished by constraint shoes 39, one on either side of the flexure—see FIGS. 13 and 14. The shoes 39 are broad T shaped in cross-section, and, as in FIG. 9, are mounted in T slots 40 in the carriage 23. The carriage is a sandwich of two plates, with the top of the constraint shoe T, as well as the slots 25 and 26 for the flexure piece, located in the top sandwich plate.

The flexure carriage 23 is provided with a central opening within which the top die approaches the bottom die. In FIG. 14, the constraint shoes 39, as the dies approach each other, are tightly engaged between the buttresses 27 and 28 and the edges of section 13 of flexure 10. Thus, the flexure piece between the dies is strongly edge constrained during the die forming. The outer ends of shoes 39 essentially are locked by friction to the buttresses, and, with a small pivot action, the inner ends move downward, remaining central on the reducing flexure thickness. The vertical clearance between shoes 39 and carriage openings 40 permit the required downward motion of flexure carriage 23 even though the outerends of shoes 39 are fixed vertically by friction to buttresses 27 and 28; holding spring 41 having ensured that the shoes 39 initially were at the bottoms of carriage openings 40. Thus edge shearing is avoided and the edge surface and form integrity of the flexure are maintained.

Since many embodiments may be made of the above invention, and since changes may be made in the embodiment set forth above without departing from the scope of the invention, it is to be understood that all matter hereinbefore set forth and in the accompanying drawings is to be interpreted as illustrative only and not in a limiting sense.

I claim:
1. A method of producing a flexure for use as a flexible support in an industrial instrument differential pressure sensing unit, wherein, with respect to an elongate, rectangular cross-sectioned metal bar, said bar is placed between a pair of male die forms of essentially rectangular die-face shape, with the rectangle of said die forms lying transversely of said elongate metal bar, and with the length of said die forms equal to and coincident with the width of said metal bar, and said metal bar is compressed between said die forms by movement of said die forms toward each other in a direction perpendicular to the faces of said die forms while flow of the metal of said bar is prevented in the direction of the length of said die forms and transversely of said metal bar through application of constraint shoes oppositely to the sides of said metal bar at the point of said compression and at the ends of said rectangular die forms, to provide said bar with a necked-down flexure portion extending transversely thereacross to provide said elongate bar with a transverse axis of flexibility whereby instrument portions joined to the ends of the length of said bar are movable with respect to each other about said bar-transverse flexure axis, said method comprising placing said metal bar in a carriage between said die forms, mounting a pair of said constraint shoes with some vertical clearance in said carriage and movable in said carriage inwardly to opposite side edges of said metal bar and moving said die forms toward each other so as to compress a transverse portion of said metal bar and, simultaneously, so as to move said carriage into a form which urges said constraint shoes inwardly against said metal bar, while avoiding shear action between the edges of said metal bar and the bar ends of said constraint shoes by pivotal action of said constraint shoes made possible by said vertical clearance of said constraint shoes in said carriage.

References Cited

UNITED STATES PATENTS

| | | | |
|---|---|---|---|
| 667,838 | 2/1901 | Collins | 16—150 |
| 2,292,176 | 8/1942 | Tate | 16—150 |
| 2,611,659 | 9/1952 | Hadley. | |
| 3,304,761 | 2/1967 | Herzog | 72—373 X |
| 3,398,444 | 8/1968 | Nemy | 72—376 X |

FOREIGN PATENTS

| | | |
|---|---|---|
| 1,033,233 | 6/1966 | Great Britain. |

ALLEN B. CURTIS, Primary Examiner

U.S. Cl. X.R.

16—150